United States Patent
Scoville (10) Patent No.: US 10,875,742 B2
(45) Date of Patent: Dec. 29, 2020

(54) ELEVATOR SERVICE REQUEST USING USER DEVICE WITH FILTERED DESTINATION FLOOR SELECTION

(71) Applicant: Otis Elevator Company, Farmington, CT (US)

(72) Inventor: Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 540 days.

(21) Appl. No.: 15/807,858

(22) Filed: Nov. 9, 2017

(65) Prior Publication Data

US 2019/0135580 A1 May 9, 2019

(51) Int. Cl.
*B66B 1/46* (2006.01)
*H04M 1/725* (2006.01)

(52) U.S. Cl.
CPC ........ *B66B 1/468* (2013.01); *B66B 2201/103* (2013.01); *B66B 2201/4615* (2013.01); *B66B 2201/4653* (2013.01); *B66B 2201/4676* (2013.01); *H04M 1/72522* (2013.01)

(58) Field of Classification Search
CPC ..................................... B66B 1/468
USPC ............................................ 187/380
See application file for complete search history.

(56) References Cited

U.S. PATENT DOCUMENTS

| | | | |
|---|---|---|---|
| 5,969,306 A | 10/1999 | Velauthapillai et al. | |
| 6,425,460 B2 | 7/2002 | Schuster | |
| 7,398,865 B2 | 7/2008 | Felder | |
| 7,469,772 B2 | 12/2008 | Takeuchi | |
| 7,766,129 B2 | 8/2010 | Makela et al. | |
| 8,136,636 B2 | 3/2012 | Bahjat et al. | |
| 8,151,942 B2 | 4/2012 | Rusanen et al. | |
| 8,584,813 B2 | 11/2013 | Talonen et al. | |
| 8,744,754 B2 | 6/2014 | Kappeler et al. | |
| 8,763,762 B2 | 7/2014 | Finschi | |

(Continued)

FOREIGN PATENT DOCUMENTS

| | | | |
|---|---|---|---|
| EP | 2262711 A1 | 12/2010 | |
| WO | 2009/127611 A1 | 10/2009 | |

(Continued)

OTHER PUBLICATIONS

European Search Report for application 18205409.8, dated Jun. 4, 2019, 9 pages.

*Primary Examiner* — David S Warren
(74) *Attorney, Agent, or Firm* — Cantor Colburn LLP (57) ABSTRACT

Methods and systems for making elevator service requests in a building having an elevator system, the method including, determining a departure floor, populating, by a computing device comprising a processor, a destination floor list with at least one destination floor and displaying the destination floor list on a user device, the destination floor list limited to a subset of all possible destination floors, and receiving at least one user input indicating a selection of a destination floor by a user and indicating a new elevator service request based on the determination of a departure floor and the selection of a destination floor. The method also includes generating an elevator service request packet based on the new elevator service request and transmitting the elevator service request packet to an elevator controller to make an elevator service request.

12 Claims, 5 Drawing Sheets

(56) References Cited

U.S. PATENT DOCUMENTS

| | | | |
|---|---|---|---|
| 9,469,502 B2 | 10/2016 | Parkkinen et al. | |
| 9,850,093 B2* | 12/2017 | DePaola | G07C 9/20 |
| 10,106,371 B2* | 10/2018 | Hanninen | B66B 1/2408 |
| 10,189,677 B2* | 1/2019 | Bryant | G06K 9/00288 |
| 10,294,071 B2* | 5/2019 | Simcik | B66B 1/468 |
| 10,384,910 B2* | 8/2019 | Simcik | B66B 1/468 |
| 10,486,937 B2* | 11/2019 | Baldi | B66B 3/002 |
| 10,486,938 B2* | 11/2019 | Baldi | B66B 1/468 |
| 10,589,960 B2* | 3/2020 | Simcik | B66B 1/3423 |
| 2015/0166302 A1 | 6/2015 | Parkkinen et al. | |
| 2015/0204678 A1* | 7/2015 | Schuster | G07C 9/28 701/522 |
| 2015/0246790 A1* | 9/2015 | Hiltunen | B66B 1/3415 187/382 |
| 2016/0009525 A1* | 1/2016 | DePaola | G07C 9/00896 187/380 |
| 2016/0130113 A1 | 5/2016 | Tokura | |
| 2016/0236903 A1* | 8/2016 | Blom | B66B 1/468 |
| 2016/0311646 A1* | 10/2016 | Bryant | B66B 1/468 |
| 2016/0325962 A1* | 11/2016 | Blandin | B66B 1/468 |
| 2016/0347578 A1 | 12/2016 | Simcik et al. | |
| 2016/0376124 A1 | 12/2016 | Bunter et al. | |
| 2017/0122744 A1 | 5/2017 | Long et al. | |
| 2017/0137255 A1 | 5/2017 | Simcik et al. | |
| 2017/0174473 A1* | 6/2017 | Simcik | G06F 3/0482 |
| 2017/0240379 A1 | 8/2017 | Simcik et al. | |
| 2017/0260023 A1 | 9/2017 | Zhang | |
| 2017/0270725 A1* | 9/2017 | Troesch | B66B 1/468 |
| 2017/0300820 A1* | 10/2017 | Raitola | B66B 1/468 |
| 2018/0118511 A1* | 5/2018 | Baldi | G06F 3/04883 |
| 2018/0118512 A1* | 5/2018 | Baldi | B66B 1/468 |
| 2018/0121072 A1* | 5/2018 | Baldi | G06F 3/04847 |
| 2018/0208430 A1* | 7/2018 | Koivisto | B66B 1/3453 |
| 2018/0282113 A1* | 10/2018 | Simcik | B66B 1/468 |
| 2018/0282114 A1* | 10/2018 | Baldi | B66B 3/002 |
| 2018/0282115 A1* | 10/2018 | Baldi | B66B 1/468 |
| 2019/0031467 A1* | 1/2019 | Simcik | B66B 1/468 |
| 2019/0047817 A1* | 2/2019 | Salmikuukka | B66B 3/00 |
| 2019/0135580 A1* | 5/2019 | Scoville | B66B 1/468 |
| 2019/0193990 A1* | 6/2019 | Hiltunen | H04W 4/80 |
| 2020/0100165 A1* | 3/2020 | Hosier, Jr. | H04W 40/20 |
| 2020/0122959 A1* | 4/2020 | Sakakura | B66B 1/468 |
| 2020/0126337 A1* | 4/2020 | Friedli | G07C 9/27 |

FOREIGN PATENT DOCUMENTS

| | | |
|---|---|---|
| WO | 2011102654 A2 | 8/2011 |
| WO | 2014116182 A1 | 7/2014 |
| WO | 2016044061 A1 | 3/2016 |

* cited by examiner

ELEVATOR SERVICE REQUEST USING USER DEVICE WITH FILTERED DESTINATION FLOOR SELECTION

BACKGROUND

The subject matter disclosed herein generally relates to service requests for elevators and, more particularly, to elevator service requests using user devices.

Elevator systems can receive input from users through mechanical, electrical, and/or electromechanical devices located within or as part of the elevator system. That is, requests for elevator service are typically made by potential passengers when the passenger is already located at an elevator landing. However, having a remote mechanism to make such requests may be advantageous. For example, the use of personal user devices can enable remote elevator service requests, potentially improving user experience and/or enabling improved elevator management within a building.

Passengers using elevators can generally give calls to elevators either in an elevator car and/or in an elevator lobby. Elevator lobbies are typically provided with up/down pushbuttons, by means of which a passenger can order an elevator to the call floor and simultaneously indicate his/her travel direction. After the elevator has arrived at the call-giving floor, the passenger moves into the elevator car and indicates his/her destination floor with the pushbuttons of the car panel in the elevator car. When the call-giving device is portable, or when the system does not otherwise know from which floor a call comes, a destination call may need to include information about the departure floor. After it has received a destination call the control system of the elevator system allocates the optimal elevator for the use of the passenger and transmits information about this to the call-giving device. In this way, the elevator system identifies to the user in response to a destination call the elevator allocated to him/her.

To improve the call-giving of an elevator system with a mobile device, one approach used has been to present the user making a destination call a convenient way of selecting a departure floor and destination floor. For example, in some systems a departure floor-destination floor grouping may be selected by the user on the basis of a touch detected with the touch-sensitive display. Selection of both the departure floor and the destination floor can thus be performed with one selection, and even with just one touch.

Moreover, commonly, the potential destination floors will be depicted as all floors in the building other than the departure floor. However, a completed listing of the potential departure and destination floors may be unwieldy and cumbersome to utilize. What would be advantageous would be a scheme of only displaying a subset of destination floors.

BRIEF SUMMARY

According to one embodiment, described herein is a method for making elevator service requests in a building having an elevator system, the method including, determining a departure floor, populating, by a computing device comprising a processor, a destination floor list with at least one destination floor and displaying the destination floor list on a user device, the destination floor list limited to a subset of all possible destination floors, and receiving at least one user input indicating a selection of a destination floor by a user and indicating a new elevator service request based on the determination of a departure floor and the selection of a destination floor. The method also includes generating an elevator service request packet based on the new elevator service request and transmitting the elevator service request packet to an elevator controller to make an elevator service request.

Also described herein in an embodiment is a user device for making elevator service requests. The user device including at least one processor, a display, and memory having instructions stored thereon that, when executed by the at least one processor, cause the user device to a method for making elevator service requests in a building having an elevator system. The method includes causing the device to determine a departure floor, populate a destination floor list with at least one destination floor and display the destination floor list on a user device, the destination floor list limited to a subset of all possible destination floors, and receive at least one user input indicating a selection of a destination floor by a user and a new elevator service request based on the selection of a destination floor. In addition, the method causes the user device to generate an elevator service request packet based on the new elevator service request, and transmit the elevator service request packet to an elevator controller to make an elevator service request.

In addition to one or more of the features described herein, or as alternatives, further embodiments of the methods may include that the subset of all possible destination floors is based upon access control permissions associated with a user.

In addition to one or more of the features described herein, or as alternatives, further embodiments of the methods may include that the subset of all possible destination floors is based upon physical constraints of the particular building or elevator system.

In addition to one or more of the features described herein, or as alternatives, further embodiments of the methods may include that the subset of all possible destination floors is based upon defined constraints of the building or elevator system.

In addition to one or more of the features described herein, or as alternatives, further embodiments of the methods may include that the subset of all possible destination floors is based upon prior knowledge of accessed floors, destination or departure floors.

In addition to one or more of the features described herein, or as alternatives, further embodiments of the methods may include that the subset of all possible destination floors is based upon even or odd floors in two-deck elevator cars.

In addition to one or more of the features described herein, or as alternatives, further embodiments of the methods may include that wherein the user selects the departure floor and the selection of the departure floor and destination floor is completed by at least one of, a press on an icon associated with a departure floor followed by a press on an icon associated with the destination floor, a swipe input from an icon for the departure floor to an icon for the destination floor, and a press and drag to and drop of an icon associated with an departure floor onto an icon associated with a destination floor.

In addition to one or more of the features described herein, or as alternatives, further embodiments of the methods may include that the departure floor is determined by the system and selected automatically.

In addition to one or more of the features described herein, or as alternatives, further embodiments of the methods may include displaying an information icon on the user interface, the information icon associated with the user input regarding an elevator service request and another user input received is at the information icon.

In addition to one or more of the features described herein, or as alternatives, further embodiments of the methods may include that the subset of all possible destination floors is based upon at least one of, access control permissions associated with a user, physical constraints of the particular building or elevator system, defined constraints of the building or elevator system, prior knowledge of accessed floors, destination or departure floors, and even or odd floors in two-deck elevator cars.

In addition to one or more of the features described herein, or as alternatives, further embodiments of the methods may include storing data related to a most recent elevator trip in a memory; wherein the data comprises at least one of, a departure floor, a destination floor, a time of day, and a location of a user, and displaying a departure floor and an destination floor associated with the most recent elevator trip on the display at a top of a recents list.

Technical effects of embodiments of the present disclosure include user devices and methods of operation configured to provide user interfaces and receive inputs thereon to generate elevator service requests.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

In general the embodiment described herein relate to methods and systems for making elevator service requests, the methods including populating, by a computing device comprising a processor, a list with at least a listing of departure floors and destination floors, wherein each the listing of destination floors is reduced as a function of the selection of a departure floor by the user. The reduced listing of destination floors corresponding to a selected subset of the possible destination floors based on constraints on access to selected destination floors based on at least the selected departure floor, and the user. The reduced set of destination floors may be displayed a display of a mobile device for selection by the user. The embodiments also include receiving a user input indicating a new elevator service request related to one of the groups, and transmitting the elevator service request to an elevator controller.

For the purposes of promoting and understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
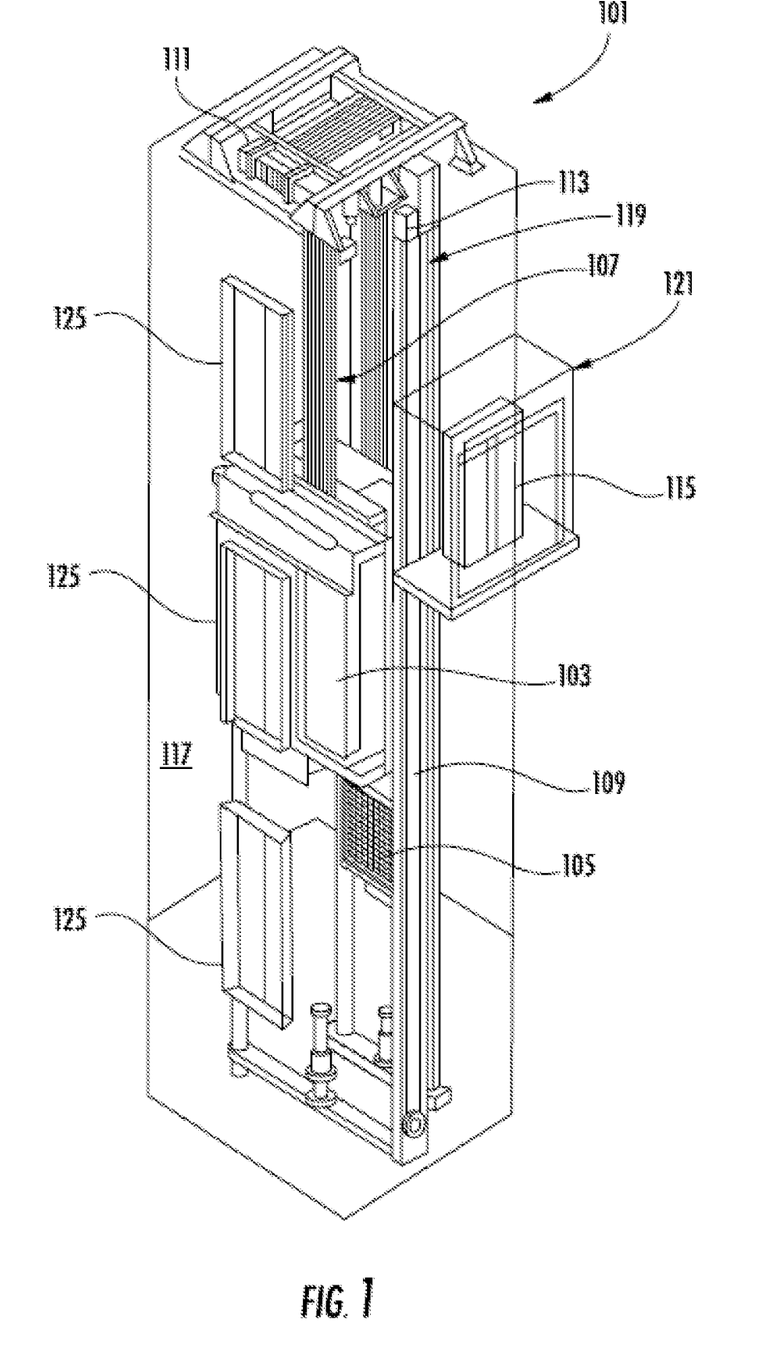
FIG. 1 is a schematic illustration of an example elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, including but not limited to, hydraulic elevator systems, ropeless elevator systems, and/or elevator systems with more than one elevator car in each elevator shaft, may employ embodiments of the present disclosure. FIG. 1 is merely a non-limiting example presented for illustrative and explanatory purposes. It should be appreciated that any elevator system or system configuration may be employed.

Figure 2:
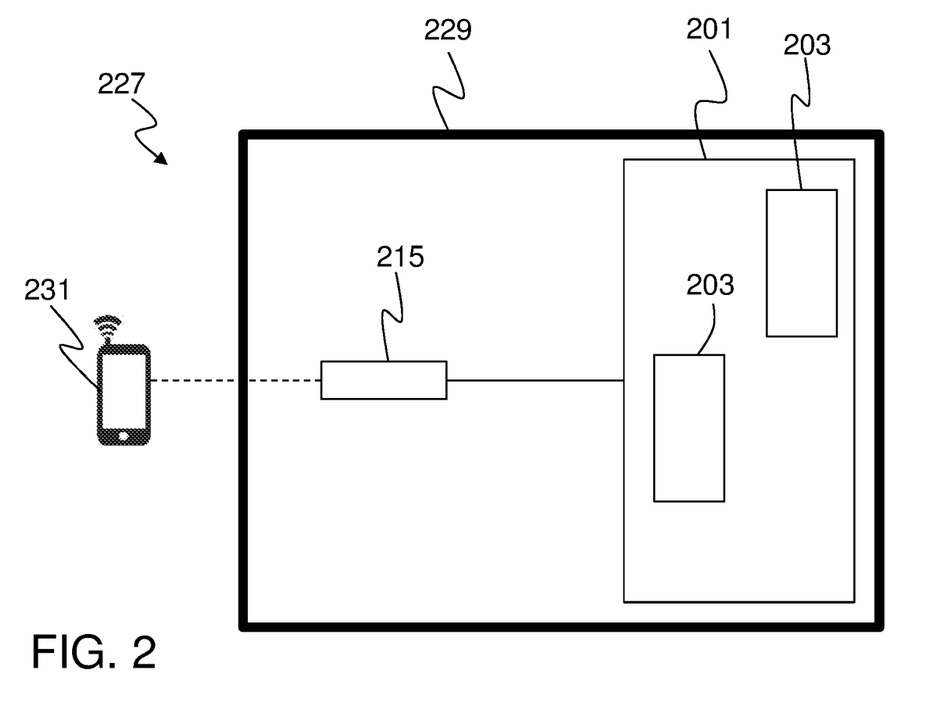
FIG. 2 is a schematic block diagram illustrating a system that may be configured in accordance with one or more embodiments of the present disclosure.

Turning now to FIG. 2, a schematic illustration of a building system 227 in an example embodiment of the present disclosure is shown. The building system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons entering the structure 229 may enter at a lobby floor, or any other desired floor, and may travel to a destination floor via one or more elevator cars 203 that are part of the elevator system 201.

The elevator system 201 may include one or more computing devices, such as an elevator controller 215. The elevator controller 215 may be configured to control dispatching operations for one or more elevator cars 203 associated with the elevator system 201. It is understood that the elevator system 201 may utilize more than one elevator controller 215, and that each elevator controller 215 may control a group of elevator cars 203 or individual elevator cars 203. Although two elevator cars 203 are shown in FIG. 2, those of skill in the art will appreciate that any number of elevators cars may be employed in the elevator and building systems that employ embodiments of the present disclosure. The elevator cars 203 can be located in the same hoistway or in different hoistways so as to allow coordination amongst elevator cars 203 in different elevator banks serving different floors (e.g., sky lobbies, etc.). It is understood that the elevator system 201 may include various features as described above with reference to FIG. 1 and may also include other non-depicted elements and/or features as known in the art (e.g., drive, counterweight, safeties, etc.). Moreover, the elevators may be employed in any configuration with all elevators serving all floors of the building, some elevators only serving certain floors, a first group of elevator serving lower floors of a building and a sky lobby and a second group of elevators serving the sky lobby and upper floors of the building, etc.

Figure 4A:
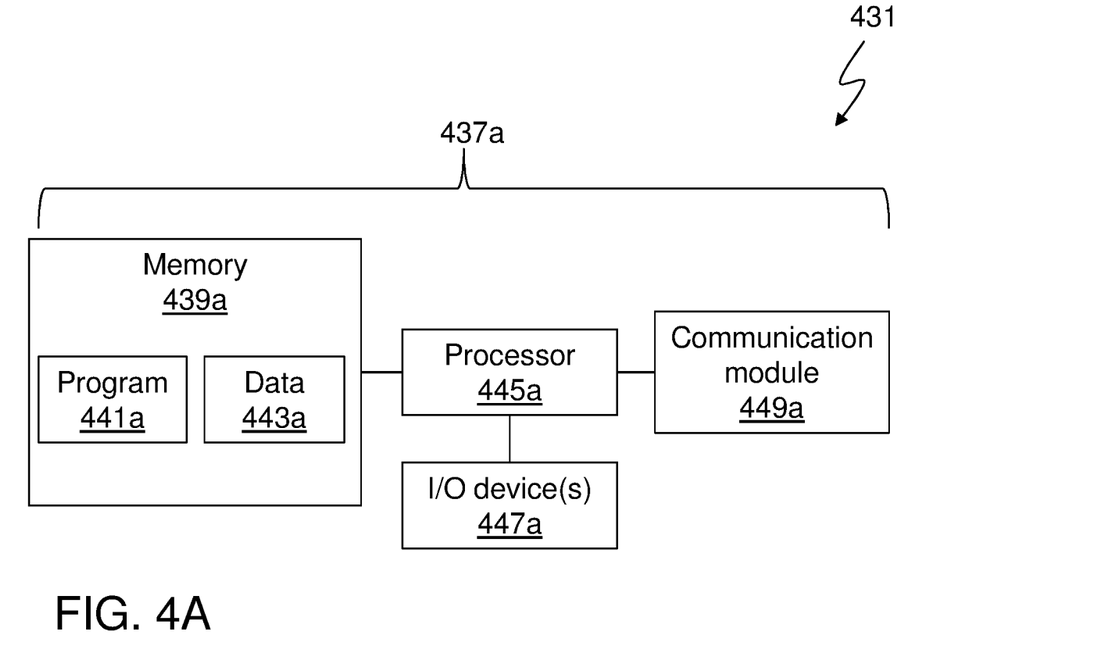
FIG. 4A is a schematic illustration of a computing system of a user device in accordance with an embodiment of the present disclosure.

Also shown in FIG. 2 is a user device 231, such as a mobile device (e.g., smart phone, smart watch, wearable technology, laptop, tablet, etc.). The user device 231 may include a mobile and/or personal device that is typically carried by a person, such as a phone, PDA, tablet, smartwatch, laptop, etc. The user device 231 may include a processor 445a, memory 439a, and communication module(s) 449a, as shown in FIG. 4A. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

Figure 4B:
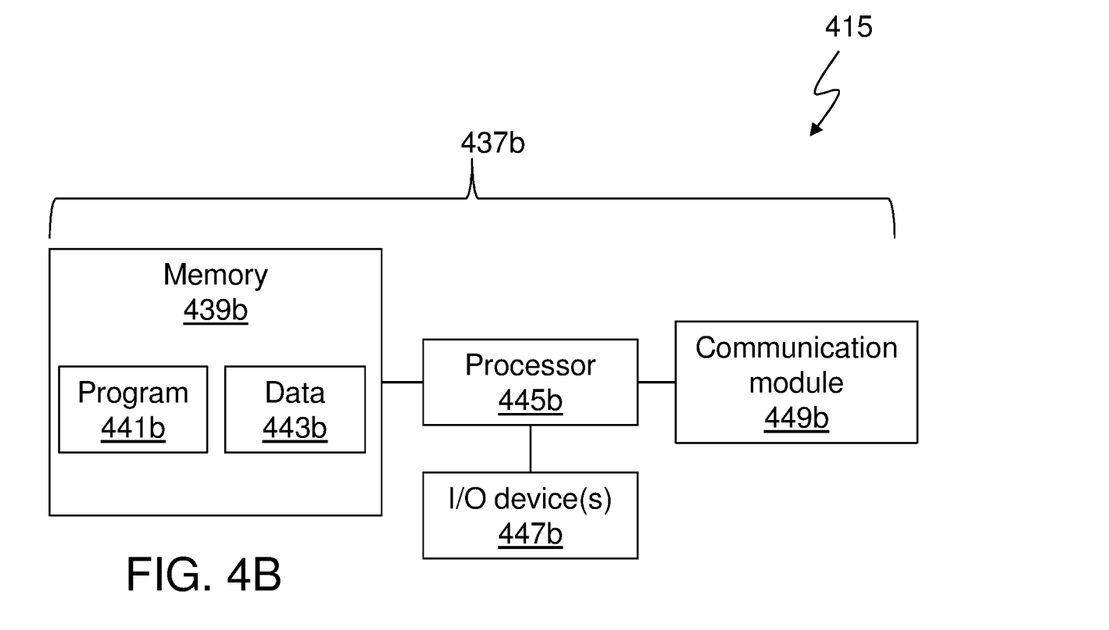
FIG. 4B is a schematic illustration of a computing system of an elevator controller in accordance with an embodiment of the present disclosure.

The elevator controller 215 may include a processor 445b, memory 439b, and a communication module 449b as shown in FIG. 4B. Similar to the user device 231, the processor memory, and communication module may be implemented as described above, but as part of the elevator system 201.

Figure 3:
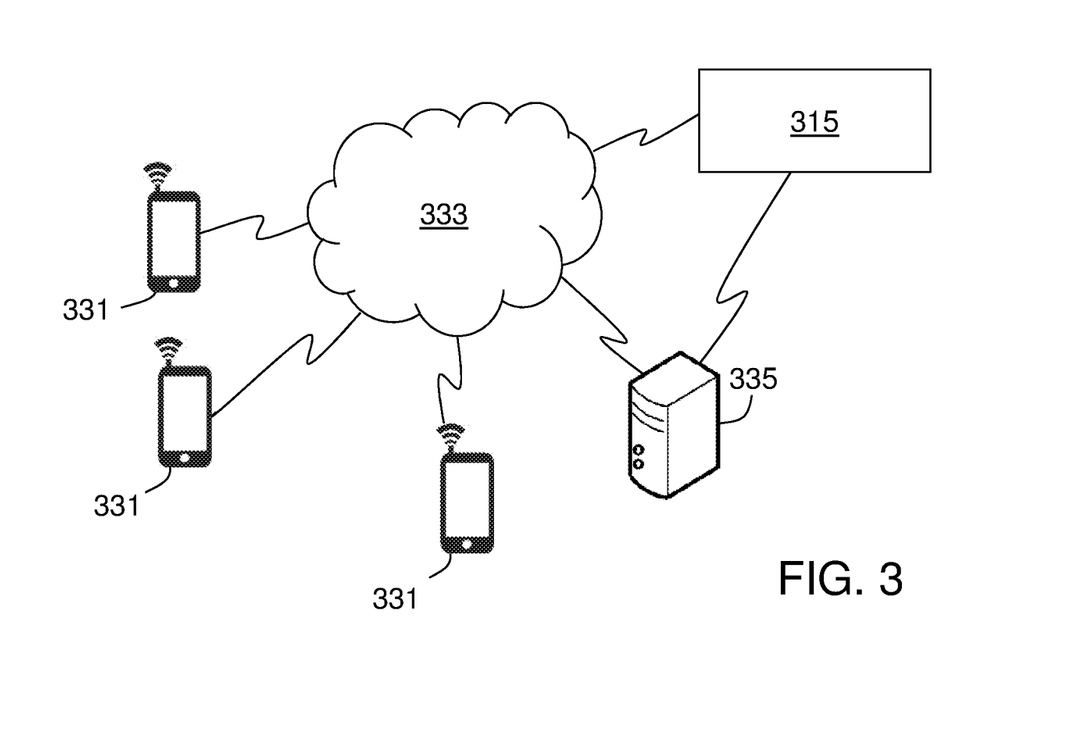
FIG. 3 is a schematic illustration of a system in accordance with an embodiment of the present disclosure.

A user device 331 and an elevator controller 315 in accordance with embodiments of the present disclosure can communicate with one another, e.g., as shown in FIG. 3. For example, one or more user device 331 and the elevator controller 315 may communicate with one another when proximate to one another (e.g., within a threshold distance). The user device 331 and the elevator controller 315 may communicate over a network 333, that may be wired or wireless. Wireless communication networks can include, but are not limited to, Wi-Fi, short-range radio (e.g., Bluetooth®), near-field infrared, cellular network, etc. In some embodiments, the elevator controller 315 may include, or be associated with (e.g., communicatively coupled to) one or more networked building elements 335, such as computers, kiosks, beacons, hall call fixtures, lanterns, bridges, routers, network nodes, etc. The networked element 335 may also communicate directly or indirectly with the user devices 331 using one or more communication protocols or standards (e.g., through the network 333).

For example, the networked element 335 may communicate with the user devices 331 using near-field communications (NFC) (e.g., network 333) and thus enable communication between the user devices 331 and the elevator controller 315. In some embodiments, the elevator controller 315 may establish communication with one or more user devices 331 that are outside of the structure/building. Such connection may be established with various technologies including GPS, triangulation, or signal strength detection, by way of non-limiting example. Such technologies that allow communication can provide users and the system(s) described herein more time to perform the described functions. In example embodiments, the user devices 331 communicate with the elevator controller 315 over multiple independent wired and/or wireless networks. Embodiments are intended to cover a wide variety of types of communication between the user devices 331 and the elevator controller 315, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. The user devices 331 and/or the networked devices 335 may be coupled to the elevator controller 315 through multiple networks 333 (e.g., cellular and Internet) so that not all user devices 331 and/or the networked devices 335 are coupled to the elevator controller 315 through the same network 333. One or more of the user devices 331 and the elevator controller 315 may be connected to the network 333 in a wireless fashion. In one non-limiting embodiment, the network 333 is the Internet and one or more of the user devices 331 execute a user interface application (e.g. a web browser) to contact the elevator controller 315 through the network 333.

Embodiments provided herein are direct to apparatuses, systems, and methods for making and fulfilling requests for elevator service. In some embodiments, a request for elevator service may be communicated over one or more lines, connections, or networks, such as network 333, e.g., a request made by a user device 331 and transmitted through the network 333 to the elevator controller 315 to request elevator service. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the user device 331. In some embodiments, a request for service may be fulfilled in accordance with one or more profiles, such as one or more user or mobile device profiles. In some embodiments the profiles may be registered as part of a registration process. In some embodiments, an elevator system 201 may be registered with a service provider.

As noted, the elevator controller 315 may be associated with an elevator system (e.g., elevator systems 101, 201). The elevator controller 315 may be used to process or fulfill the requests for elevator service that are submitted from one or more user devices 331. The requests for elevator service may be received through the network 333 from the one or more user devices 331 and/or the networked building elements 335, which may be mobile devices, including, but not limited to phones, laptops, tablets, smartwatches, etc. One or more of the user devices 331 may be associated with (e.g., owned by) a particular user. The user may use his/her user device(s) 331 to request elevator service.

For example, a user of a user device 331 may request service in an affirmative or active manner. The user may enter a request for elevator service using an I/O interface of the user device 331, as described herein. That is, in some embodiments, an application, app, or other program may be installed and operated on the user device 331 wherein the user may interact with the app or program to request elevator service.

In other embodiments, or in combination therewith, the user may request elevator service in a passive manner. For example, a profile may be established for the user or the particular user device 331, optionally as part of a registration process with, e.g., a service provider and/or through historical data tracking. The profile may contain a log of the user's history and/or activities, such as where the user has gone or traveled to, the user's preferences, or any other data that may be applicable to the user. In some embodiments, the user profile may be accessed or analyzed to determine the likelihood or probability that the user will request elevator service at a particular moment in time (e.g., a particular day or time of day). Resources may be provisioned or allocated to fulfill the request (e.g., an elevator car call or reservation may be placed) in the event that the probability of requested service, or consumption, or use of an elevator is anticipated.

The request for service may be conveyed or transmitted from the user device 331 through the network 333. For example, the request for service may be transmitted to and/or over the Internet and/or a cellular network. The network(s) 333 may include infrastructure that may be organized to facilitate cloud computing. For example, one or more servers, such as a primary message server, a backup message server, and a device commissioning message server may be employed as part of the network 333.

In some embodiments, the request for service may specify a type of service requested, at any level of detail or abstraction. For example, a first request for service may specify that elevator service is requested, a second request for service may specify one or more of a departure floor and/or a destination floor, and a third request for service may specify that elevator service is desired to accommodate a heavy load (e.g., freight or cargo) with a number of other users or passengers in an amount less than a threshold. In some embodiments, the request for service transmitted from the user device 331 may include an identifier associated with the user or the particular user device 331 in order to allow the elevator controller 315 to distinguish between users and/or user devices 331.

Referring now to FIGS. 4A-4B, schematic block diagram illustrations of example computing systems 437a, 437b for a user device 431 and an elevator controller 415, respectively, are shown. The computing system 437a may be representative of computing elements or components of user devices 431, networked elements, mobile devices, etc. as employed in embodiments of the present disclosure. The computing system 437b may be representative of computing elements or components of controllers, elevator controller, networked elements, computers, etc. For example, the computing system 437a can be configured as part of a user device 431, e.g., user device 231, 331 shown above. The computing system 437a can be configured to operate the user device 431, including, but not limited to, operating and controlling a touch-screen display to display various output and receive various input from a user's interaction with the touch-screen display. The computing system 437b can be configured as part of an elevator controller, e.g., elevator controller 115, 215, 315, 415 shown above. The computing system 437b can be a computer or other type of controller that is physically connected or remote from mechanical control of the elevator system 201. The computing system 437b may be connected to various elements and components within a building that are associated with operation of an elevator system 201.

As shown, the computing system 437a includes a memory 439a which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4A as being associated with a program 441a. The memory 439a can include RAM and/or ROM and can store the program 441a thereon, wherein the program 441a may be a mobile operating system and/or mobile applications to be used on the user device 431.

Further, the memory 439a may store data 443a. The data 443a may include profile or registration data (e.g., in a user device 431), a device identifier, or any other type(s) of data. The executable instructions stored in the memory 439a may be executed by one or more processors, such as a processor 445a, which may be a mobile processor in the user device 431. The processor 445a may be operative on the data 443a and/or configured to execute the program 441a. In some embodiments, the executable instructions can be performed using a combination of the processor 445a and remote resources (e.g., data and/or programs stored in the cloud (e.g., remote servers)).

The processor 445a may be coupled to one or more input/output (I/O) devices 447a. In some embodiments, the I/O device(s) 447a may include one or more of a physical keyboard or keypad, a touchscreen or touch panel, a display screen, a microphone, a speaker, a mouse, a button, e.g., parts or features of a telephone or mobile device (e.g., a smartphone. For example, the I/O device(s) 447a may be configured to provide an interface to allow a user to interact with the user device 431. In some embodiments, the I/O device(s) 447a may support a graphical user interface (GUI) and/or voice-to-text capabilities for the user device 431.

The components of the computing system 437a may be operably and/or communicably connected by one or more buses. The computing system 437a may further include other features or components as known in the art. For example, the computing system 437a may include one or more communication modules 449a, e.g., transceivers and/or devices configured to receive information or data from sources external to the computing system 437a. In one non-limiting embodiments, the communication modules 449a of the user device 431 can include a near-field communication chip (e.g., Bluetooth®, Wi-Fi, etc.) and a cellular data chip, as known in the art. In some embodiments, the computing system 437a may be configured to receive information over a network (wired or wireless), such as network 333 shown in FIG. 3. The information received over the network may be stored in the memory 439a (e.g., as data 443a) and/or may be processed and/or employed by one or more programs or applications (e.g., program 441a).

The computing systems 437a may be used to execute or perform embodiments and/or processes described herein, such as within and/or on user devices. For example, the computing system 437a of the user device 431 enables a user interface to enable a user to make service requests to an elevator. To make such service requests, the user device 431, and the computing system 437a thereof, may communicate with the computing system 437b of the elevator controller 415.

For example, as shown in FIG. 4B, the elevator controller 415 includes a computing system 437b that is used to receive commands and/or instructions (e.g., data) from remote devices, including, but not limited to, the user device 431. The computing system 437b is configured to control operation of and/or reservation of elevator cars within one or more elevator hoistways. The computing system 437b, memory 439b (and program stored thereon) may be configured to process requests for elevator service received from one or more user devices (e.g., user device 431). As part of the processing, the computing system 437b may validate or authenticate the user device 431 such that only certain user devices 431 may be able to communicate and/or make elevator service requests to the elevator controller 415.

As shown, the computing system 437b of the elevator controller 415 includes components similar to that shown and described with respect to the computing system 437a of FIG. 4A. As such, the elevator controller computing system 437b includes a memory 439b with at least one program 441b and data 443b stored thereon. The data 443b may include profile or registration data (e.g., related to user devices), elevator car data, elevator control data and/or programs, or any other type(s) of data associated with control and/or operation of an elevator system. A processor 445b may be configured to receive service requests through a communication module 449b from one or more user devices 431. The computing system 437b may further include one or more I/O devices 447b, including, but not limited to, control connections to one or more elevator mechanical controls and/or elevator cars. Further, in some configurations, the I/O devices 447b can include a monitor or display screen as part of a user interactive computing system that is associated with the elevator system and/or elevator controller 415.

Figure 5A:
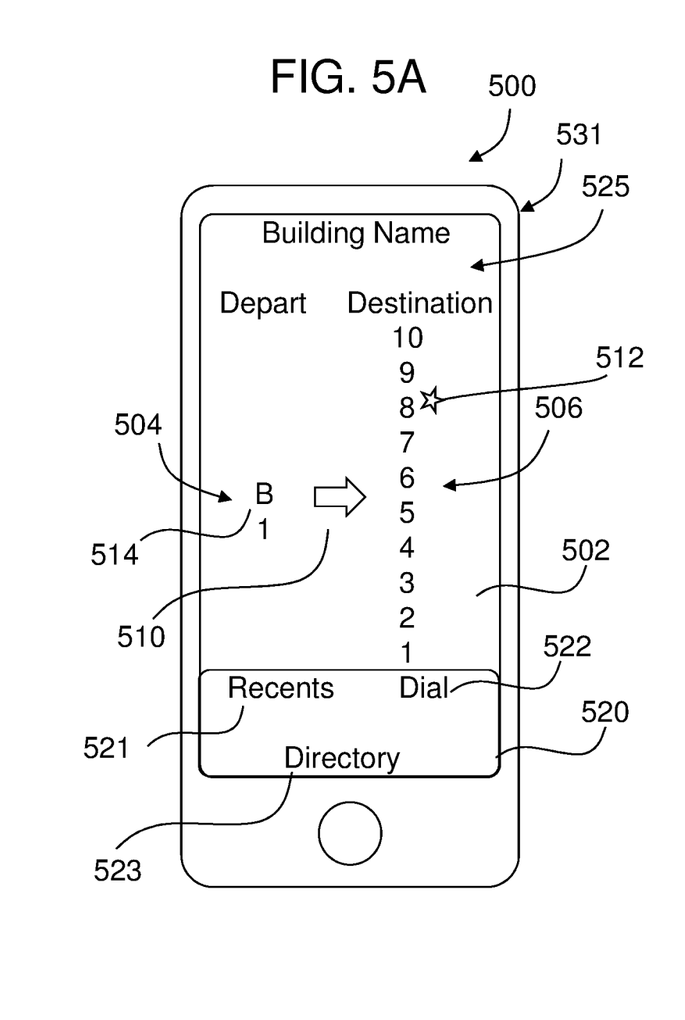
FIG. 5A is a schematic illustration of a user interface on a user device in accordance with an embodiment of the present disclosure.
Figure 5B:
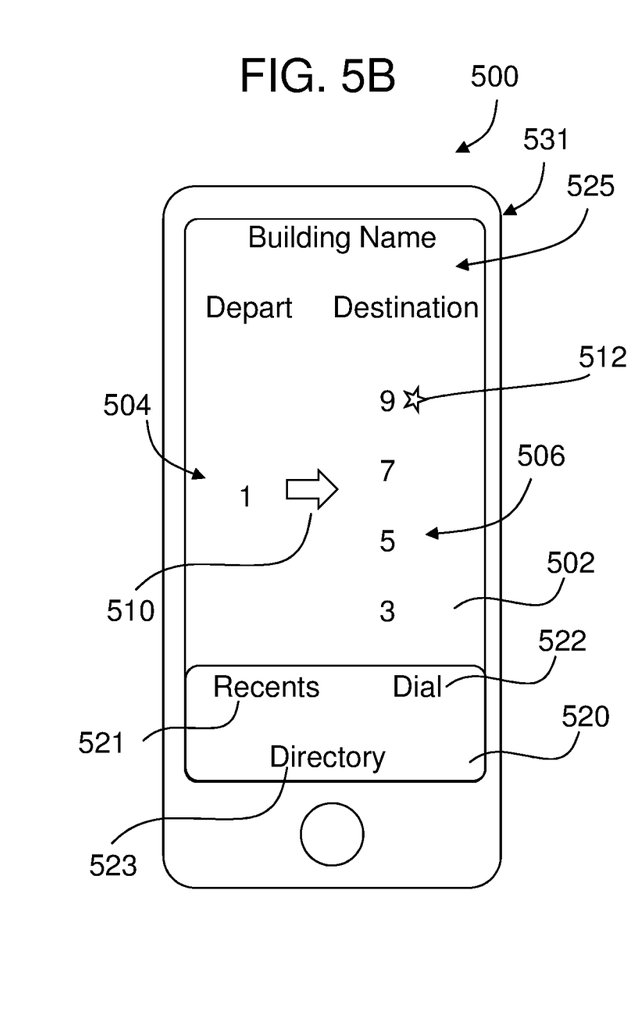
FIG. 5B is another schematic illustration of the user interface in accordance with an embodiment of the present disclosure.

Turning now to FIG. 5A and FIG. 5B, various illustrations of a user interface 500 implemented on a user device 531 (comparable to 231, 331, 431) in accordance with several embodiments of the present disclosure are shown. As shown in FIGS. 5A-5B, a screen 502 of a user device 531 may display the user interface 500 that represents a screen or interface of an application in accordance with an embodiment of the present disclosure. The user interface 500 can enable a user to make elevator service requests by operation and interaction with the user interface 500 displayed on the screen 502. That is, the user interface 500 can enable a user device 531 to communicate with an elevator controller e.g., 215, 315, 415, to make an elevator service request.

In the embodiment shown in FIGS. 5A-5B, a column of potential departure floors 504 and destination floors 506 may be stored in or transmitted to the application or program (or memory associated therewith). Embodiments provided herein enable simple ways to interact with and select a particular departure floor 504 and a destination floor 506 to gain more information related to one or more of the floors, and ultimately to place an elevator service request to travel between the selected departure floor 504 and a desired destination floor 506. For example, a selectable list, scrolling list, a "rolling wheel" type depiction, a tabular array and the like, may be employed to facilitate a user's selection on the user device 531.

Continuing with FIGS. 5A and 5B, the departure floors 504 and destination floors 506 may be set, established, or stored based on use of the features of the user interface 500 in a conventional manner as in known in the art. As shown, the departure floors 504 column and destination floors 506 may be indicated as an origin floor/landing on the left sometimes labeled "From", and a destination floor/landing on the right thereof, also sometimes labeled "To." In some embodiments a direction indicator 510 may also be provided between the origin/departure floor 504 and destination floor/landing 506, for example, an arrow, or the icon may be shaped to indicate direction. Each of the departure floors 504 and destination floors 506 can include alphanumeric characters 514 or words and the like, as illustrated. Further, as shown, any of the elements of the departure floors 504 and destination floors 506 can include additional information, icons, etc. For example, as shown, an information icon 512 can be displayed over the icon or floor number indicator, to thus provide information to a user regarding the indicated floor, (e.g., if a cafeteria is located on the particular floor).

Further, in some embodiments, users may assign custom labels (e.g., "Lobby", "home," "gym," "cafeteria," "work," "HR," "dentist," etc.) to a particular destination floor 506 or departure floor 504. In such configuration, the user may interact with the custom label as indicated by the gestures described above. Further, for example, when pressing and holding a custom label, the alphanumeric information of the selected floor associated with the custom may be revealed (e.g., display of floor numbers). Further, as illustrated in FIG. 5A, a user may press and hold on a selected number icon for a departure floor 504 or destination floor 506, a display element thereof, and/or an information icon 512 to reveal more information about a particular or specific floor.

In an embodiment, when a user seeks to travel from a departure floor 504 to a destination floor 506 the user selects the departure floor 504 and then the destination floor 506. Additionally, a user may press and hold on a departure floor 504 and then swipe/drag (e.g., to the right) onto the number of the desired destination floor 506 to signal an intent to enable selection of the particular departure floor 504 and destination floor 506 and initiate the call request. In some embodiments the departure floor 504 may be automatically determined and populated on the user device 531. Referring now to FIG. 5B specifically, in an embodiment, when the user selects the departure floor 504 on the user interface 500 of the user device 531, only that departure floor 504 remains displayed. Likewise, the user interface 500 now presents a modified display of potential destination floors 506. The new destination floors 506 being a subset of the available destination floors 506 that are accessible to the user. That is, as depicted, once floor "1" is selected as the departure floor 504, then the user interface display on the user device 531 is modified to display a reduced "permitted" accessible destination floors 506, in this instance, floors "3", "5", "7", and "9."

The destination floor 504 listing may be filtered and reduced from the full listing of possible floors to a subset of all possible destination floors as smaller list depending on constraints associated with the user. For example the potential destination floors 506 may be limited by any number of factors such as access controls limiting a user's access to selected floors, physical constraints of the building, and the like. As one example of access controls, a particular user may only be permitted access to the floors of the building occupied by their company, or even only a certain floor within the range of floors populated by their company. Other examples include permitted access to a cafeteria, gym, the passenger's apartment, hotel room or any other desired destination for which it is desirable to limit or otherwise restrict access. As an example of physical constraints of the building, one particular elevator bank may only serve a sky lobby and the ground floor. A user taking that elevator back would only be presented one of those two floors as a potential destination floor 506. As another example, certain floors of a building may simply be inaccessible for one reason or another and, thus, are not included in the list of potential destination floors 506.

In addition, in an embodiment, access to selected departure floors 504 or destination floors 506 may also be constrained by the building manager. For example, access to selected floors may be limited based on time of day, or a particular elevator out of a group of elevators to improve efficiency and flow in the elevator system for the building. Examples of constraints may include restricted floors, e.g., destination floors 506 to which access is not permitted, e.g., secure floors, other businesses, restricted floors in residential buildings and the like. For example, in a residential setting or business setting, for a selected user, when the departure floor is the lobby, perhaps the only destination floor displayed is that associated with the user's residence or business. Likewise, examples of physical constraints might include destinations that are not possible, for example floors above a sky lobby where a stop at the sky lobby is required.

Another constraint that may be employed is prior knowledge of accessed floors, destination or departure floors. For example, if a passenger had selected the sky lobby as the immediately previous destination floor 506 from a lower departure floor 504, then the sky lobby may automatically be displayed as the departure floor 504 while the destination on the user interface 500 need only display accessible floors above the sky lobby. Similarly for passengers descending from above the sky lobby, when sky lobby is the destination floor 506, the sky lobby may automatically be selected as the departure floor 504 and only accessible floors below the sky lobby need be displayed as potential destination floors 506.

Another example might address even or odd floors in two-deck elevator cars. If a user accesses the elevator at floor "1," access to floor "2" may not be permitted and thus would not be listed on the display of the user device 531 as a selectable destination floor 506.

As shown, the user interface 500 further includes an information region 520. In some embodiments, the information region 520 can include a dropdown/popup menu to enable a user to select different addresses/buildings. Further, as shown, the information region 520 can include various interactive elements 525. In the illustrations of FIGS. 5A-5B, the interactive elements 525 include a "Recents" tab 521 a "Dial" tab 522, and a "Directory" tab 523. In one non-limiting embodiments, a user can click on the "Recents" tab 521 to display the user interface 500 shown in FIGS. 5A-5B. The "Recents" tab 521 may provide a recents list or list of elevator trips that have recently or historically been taken by a user of the user device 531. That is, a recents list may be displayed to a user such that the user can view recent or historical elevator trips. The "Recents" list can include one or more retained floor departure floors 504 or destination floors 506, i.e., previous departure and destination floor (504, 506) selections as shown in FIGS. 5A-5B.

Similarly, a user can click on the "Dial" tab 522 of the interactive elements 520 to display a dial on the user interface 500 where the user may elect to manually select the departure floor 504 and a destination floor 506, or just a destination floor 506, to create an elevator call. In one embodiment a keypad is presented for entry of the floor information. Similarly, a user can click on the "Directory" tab 523 of the interactive elements 520 to display a menu of call related actions, such as a contacts list (Directory of locations, people, floors in a given building, similar to a phone directory), the key pad (the elevator call interface), recent calls (saved/recent/favorite trips) on the user interface 531 shown in FIGS. 5A-5B.

Additionally the information region 520 may include additional or alternative tabs as needed to facilitate planning and using the elevator trip. For example, the information region 520 may include a "New Trip" tab to display on the user interface 531 as screen for entering a new trip with a new departure floor and destination floor 506. In some embodiments, the "New Trip" tab may bring up key pad (not shown) to enable a user to input another departure floor 504 and destination floor 506 that is different from those depicted.

As shown, the user interface 500 includes additional features, which may be optional. For example, an information region 525 can be located within the user interface 500. As shown, the information region 525 also provides information regarding the current building (e.g., an address) for which the user is using the interface 500 to communicate and/or control the elevator system. In some embodiments, such information region 525 can be static and/or defined by various information obtained by a user device 531 (such as GPS, Wi-Fi location, etc.). In other embodiments, the information region 525 can be an interactive tab or other interactive feature that can enable a user to make selections, change displayed information, change the building selection to another building, etc. Although shown at the top and bottom of the user interface 500, the information region 525 can be located at any position on the user interface 500 and/or can take various geometric forms, colors, etc.

Figure 6:
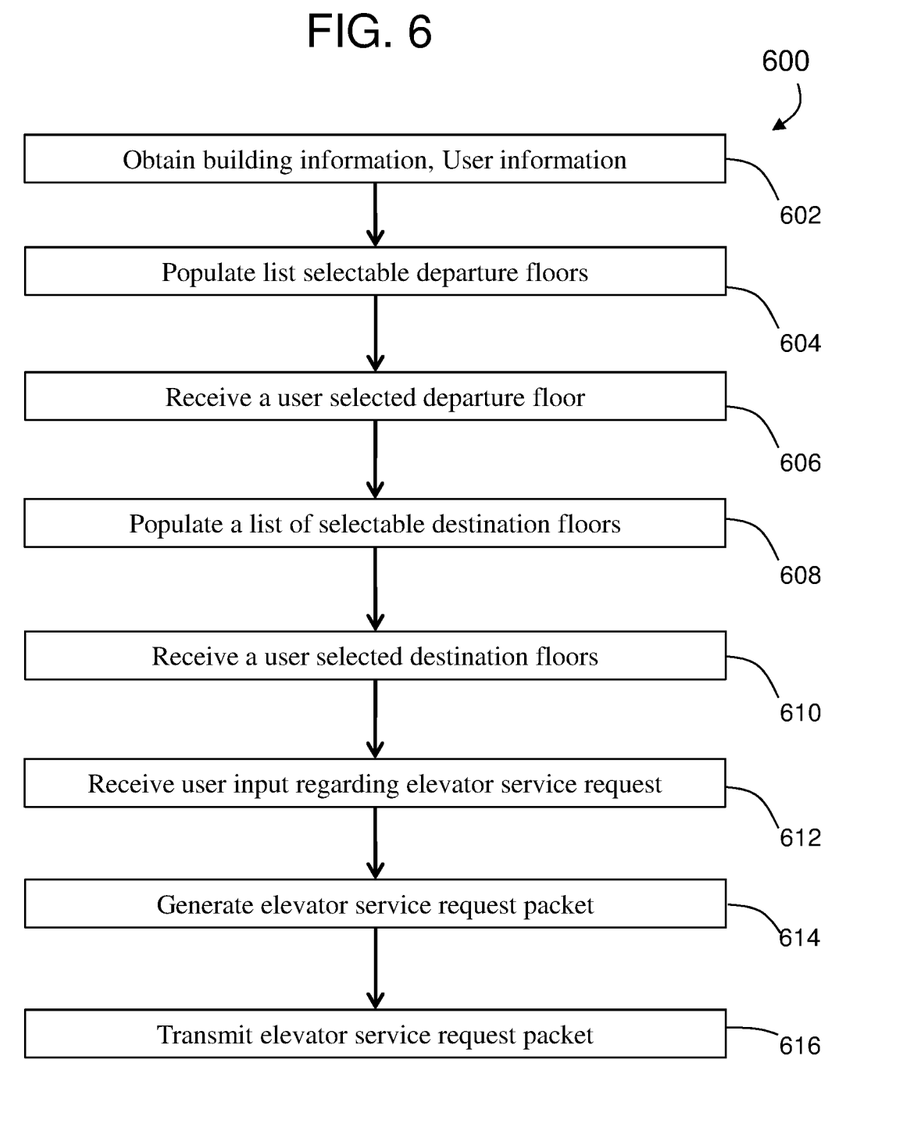
FIG. 6 illustrates a flow process for interacting with an elevator system in accordance with another embodiment of the present disclosure.

Turning now to FIG. 6, a flow process 600 in accordance with an embodiment of the present disclosure is shown. Flow process 600 may incorporate additional or alternative steps without departing from the scope of the present disclosure. The flow process 600 may be performed by a processor on a user device (e.g., 231, 331, 431, 531 as described above) with various related applications and/or data stored in a memory of the user device.

At block 602, the user device (e.g., 231, 331, 431, 531) obtains building information over one or more networks (e.g., Wi-Fi, Bluetooth®, geolocation, RFID, local network, etc.). The building information can include information regarding one or more elevator systems located within the building. Such elevator system information can include all available floors to which elevator cars travel and/or information regarding the one or more floors (e.g., tenants, features of the floors, etc.). At block 604, list elements are populated in one or more lists of the potential departure floors 504. In an embodiment, the full list of potential departure floors 504 may be displayed based on the particular building. In another embodiment, the departure floor 504 is determined automatically and displayed on the user device 531. In one embodiment, the departure floor 504 is determined and/or selected based on position information or local communication with the elevator system 101. At block 606, in an embodiment, a first user input request is received regarding a first entry (e.g., selection of a "from" or departure floor 504 from one of the displayed listing for that given building). In embodiments, where the departure floor is automatically determined the selection is not needed or optional.

Once the departure floor 504 is determined, the list of potential destination floors 506 may also be populated and displayed on the user device 531. Optionally, the full list of potential destination floors 506 may also be populated and displayed on the user device 531. In alternative configurations, the departure floors 504 and potential destination floors 506 and any recent floor selections are retained digitally on the memory of the user device 531, and a user can interact with the retained floor information. In still further embodiments, a user may use voice input to interact with and prompt the system to reference and select from the floor information. At block 608, list elements are populated in one or more lists of the potential destination floors 506. The list of potential destination floors 506 is subject to the access and building constraints for the user, and is then populated and displayed on the user device 531. Alternatively, the previously displayed listing of all destination floors 506 is modified to include only those destination floors 506 accessible by the user. In alternative configurations, the accessible destination floors 506 are retained digitally on the memory of the user device 531, and a user can interact with the retained floor information. In still further embodiments, a user may use voice input to interact with and prompt the system to reference and select from the floor information. Advantageously, the reduced listing of destination floors provides a simpler easier display for the user and simplifies the destination floor 506 selection.

At block 610, a second user input request is received regarding a second entry (e.g., selection of destination floor 506). At block 612 a user input is received regarding the elevator service request. In some embodiments depending on the user interface 500, for example a user swipes from a first entry to the second entry. In some configurations, depending on the user interface 500, for example, a user presses the icon for the departure floor 504 and then drags it to and drops at a second entry signaling selection of the destination floor 506. In another embodiment the user presses the icon for the departure floor 504, the destination floor list is populated and then the user presses the icon for the destination floor 506. In an embodiment another icon may be provided for a "call", "select" or "send request" function for the user to send the elevator call.

It will be appreciated that the functions of block 610 and block 612 may be combined or part of the same step. For example, in one embodiment when a user selects and drags the icon for the origination floor and drops it to the destination floor, the placement on the destination floor 506 may operate as both the selection of the second entry as well as the service request. Moreover, in another example, the user may swipe across one of the retained floor pairs/set of the user interface 500 (e.g., on the retained floor pair/set list). Such swiping on the user interface 500 can indicate the selection of the departure floor 504, destination floor 506 and the user's desire to request elevator service to travel between those elevator floors. In another embodiment, swiping may prompt a call elevator icon or button to appear on the user interface 500, which can then be selected by the user. In other embodiments, a call elevator button may be displayed and a user may select the call elevator button to make an elevator service request.

At block 614, an elevator service request packet can be generated within the user device 531 in response to the user input request received at block 612. The elevator service request packet can be an electronic communication packet that is configured to be transmitted over one or more different types of communication networks and can be configured to be read by an elevator controller or a computer system/program associated with an elevator controller (e.g., 231, 331, 431, and 531). At block 616, the generated elevator service request packet can be transmitted to an elevator controller or network of the building to which the elevator controller (e.g., 231, 331, 431, and 531) is connected. Accordingly, an elevator service request can be generated and requested remotely by operation of a user device employing flow process 600.

As described herein, in some embodiments various functions or acts may take place at a given location and/or in connection with the operation of one or more apparatuses, systems, or devices. For example, in some embodiments, a portion of a given function or act may be performed at a first device or location (e.g., user device 531), and the remainder of the function or act may be performed at one or more additional devices or locations (e.g., elevator controller). Further, embodiments described herein may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be employed without departing from the scope of the present disclosure.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A method for making elevator service requests in a building having an elevator system, the method comprising:
    determining a departure floor;
    populating, by a computing device comprising a processor, a destination floor list with at least one destination floor and displaying the destination floor list on a user device, the destination floor list limited to a subset of all possible destination floors;
    receiving at least one user input indicating a selection of a destination floor by a user and indicating a new elevator service request based on the determination of a departure floor and the selection of a destination floor;
    generating an elevator service request packet based on the new elevator service request; and
    transmitting the elevator service request packet to an elevator controller to make an elevator service request;
    wherein the subset of all possible destination floors is based upon at least one of:
        access control permissions associated with a user;
        physical constraints of the particular building or elevator system;
        constraints of the building or elevator system;
        even or odd floors in two-deck elevator cars.

2. The method of claim 1, wherein the subset of all possible destination floors is further based upon prior knowledge of accessed floors, destination or departure floors.

3. The method of claim 1, wherein the user selects the departure floor and the selection of the departure floor and destination floor is completed by at least one of:
    a press on an icon associated with a departure floor followed by a press on an icon associated with the destination floor;
    a swipe input from an icon for the departure floor to an icon for the destination floor; and
    a press and drag to and drop of an icon associated with a departure floor onto an icon associated with a destination floor.

4. The method of claim 1, wherein the departure floor is determined by the system and selected automatically.

5. The method of claim 1, further comprising:
    displaying an information icon on the user interface, the information icon associated with the user input regarding an elevator service request; and
    wherein another user input is received at the information icon.

6. The method of claim 1, further comprising:
    storing data related to a most recent elevator trip in a memory; wherein the data comprises at least one of, a departure floor, a destination floor, a time of day, and a location of a user; and
    displaying a departure floor and a destination floor associated with the most recent elevator trip on the display at a top of a recents list.

7. A user device for making elevator service requests, the user device comprising:
    at least one processor;
    a display; and
    memory having instructions stored thereon that, when executed by the at least one processor, cause the user device to:
        determine a departure floor;
        populate a destination floor list with at least one destination floor and display the destination floor list on a user device, the destination floor list limited to a subset of all possible destination floors;
        receive at least one user input indicating a selection of a destination floor by a user and a new elevator service request based on the selection of a destination floor;
        generate an elevator service request packet based on the new elevator service request; and
        transmit the elevator service request packet to an elevator controller to make an elevator service request;
        wherein the subset of all possible destination floors is based upon at least one of:

access control permissions associated with a user;
physical constraints of the particular building or elevator system;
constraints of the building or elevator system;
even or odd floors in two-deck elevator cars.

8. The user device of claim 7, wherein the subset of all possible destination floors is further based upon prior knowledge of accessed floors, destination or departure floors.

9. The user device of claim 7, wherein the user input includes at least one of:
a press on an icon associated with a departure floor followed by a press on an icon associated with the destination floor;
a swipe input from an icon for the departure floor to an icon for the destination floor; and
a press and drag to and drop of an icon associated with a departure floor onto an icon associated with a destination floor.

10. The user device of claim 7, the instructions further comprising additional instructions to:
display an information icon on the user interface, the information icon associated with the user input regarding an elevator service request; and
wherein another user input is received at the information icon.

11. The user device of claim 7, the instructions further comprising additional instructions to:
store data related to a most recent elevator trip in a memory, wherein the data comprises at least one of, a departure floor, a destination floor, a time of day, and a location of a user; and
displaying a departure floor and a destination floor associated with the most recent elevator trip on the display at a top of a recents list.

12. The user device of claim 7, wherein the computing device is a smartphone.

* * * * *